Patented Dec. 28, 1937

2,103,309

UNITED STATES PATENT OFFICE 2,103,309

DYE COMPOSITION FOR THE TREATMENT OF EXTERNAL BURNS IN HUMAN BEINGS

Robert H. Aldrich, Boston, Mass., and David A. Bryce, Bound Brook, N. J., assignors to Calco Chemical Company, Inc., Bound Brook, N. J., a corporation of Delaware No Drawing. Application January 14, 1935, Serial No. 1,606

5 Claims. (Cl. 167—58)

This invention relates to a composition for use in the local treatment of traumatized surface areas in human beings, and is more particularly directed to a mixture of dye materials having value for the treatment of skin burns.

The treatment of burns generally involves the use of dilute tannic acid solutions or in some cases various bland antiseptics. Other substances which have been used include picrates, picramates, and allied dyes generally of a poisonous character.

We have discovered compositions suitable for use in the treatment of burns of the human body, which compositions have many advantages over the materials previously used. The following is one specific example of our compositions, given purely by way of illustration.

A mixture is made up of the following materials, the parts being given by weight:

| | Parts |
|---|---|
| Crystal violet (hexamethyl pararosaniline hydrochloride) | 1.5 |
| Neutral acriflavine (the base of 3:6-diamino-10-methyl acridinium chloride monohydrochloride) | 0.75 |
| Brilliant green (the sulphate of tetraethyl diamino triphenyl carbinol anhydride) | 1.0 |

In practice, 97.5 grams of this mixture is dissolved in 3000 cc. of water and the resulting solution is applied to the burned surface or surfaces with a suitable vaporizer, atomizer, spray or the like. The sprayed surface is then permitted to dry. Ordinarily, the burned surfaces are sprayed repeatedly with this mixture, at increasing intervals of from one to several hours, according to conditions, for a period of usually about fifteen days.

The use of the above described mixture provides simultaneously to the patient skin antisepsis, analgesia, movable and flexible eschar, freedom from fever and toxemia, and conservation of body fluids. In addition, the use of our mixtures results in decreasing deformity, decreasing the amount of eventual surgery necessary, and minimizing contractures.

In addition, our mixtures are materials fulfilling definite bacteriological and surgical purposes in the treatment of burns. Further, our mixtures comprise relatively common and economical materials which may be, and generally are, used in aqueous solution.

In place of brilliant green, we may use the same amount of basic fuchsine (a mixture of pararosaniline and rosaniline hydrochlorides) without altering the effectiveness of the mixture. When this substitution is made, the same quantity of basic fuchsine is used as the amount of brilliant green previously called for. In these compositions, the brilliant green has a bacteriostatic effect on many types of bacteria, and in addition is a mild stimulant to tissue regeneration. The basic fuchsine is effective against many strains of gram-negative organisms.

The proportions of the dyes in our compositions may be varied within narrow limits, chiefly in a downward direction since all of the ingredients of the mixture are relatively slightly soluble in water. It will be obvious that the solution used may be diluted below the concentration set forth since the water used evaporates and plays no part in the eventual effectiveness of our compositions.

It will be seen that other changes and variations may be made in our compositions without departing from the spirit and scope of our invention except as defined in the appended claims.

What we claim is:

1. A composition for the treatment of burns comprising crystal violet, neutral acriflavine and a material selected from the group consisting of brilliant green and basic fuchsine.

2. A composition for the treatment of burns comprising 1.5 parts by weight crystal violet, 0.75 part by weight neutral acriflavine and 1 part by weight of a material selected from the group consisting of brilliant green and basic fuchsine.

3. A composition for the treatment of burns comprising an aqueous solution of crystal violet, neutral acriflavine and a material selected from the group consisting of brilliant green and basic fuchsine.

4. A composition for the treatment of burns comprising crystal violet, neutral acriflavine and brilliant green.

5. A composition for the treatment of burns comprising crystal violet, neutral acriflavine and basic fuchsine.

ROBERT H. ALDRICH.
DAVID A. BRYCE.